United States Patent
Lechot

[11] 3,714,853
[45] Feb. 6, 1973

[54] AUTOMATIC LATHES
[76] Inventor: Andre Lechot, Orvin, Switzerland
[22] Filed: Dec. 18, 1970
[21] Appl. No.: 99,498

[30] Foreign Application Priority Data
Dec. 23, 1969 Switzerland.....................19191/69

[52] U.S. Cl. ...................82/2.5, 214/1.2, 214/1.5, 279/102
[51] Int. Cl. ...........................................B23b 13/02
[58] Field of Search ............82/2.5, 2.7; 214/1.1, 1.2, 214/1.3, 1.4, 1.5; 279/1 ME

[56] References Cited

UNITED STATES PATENTS

| | | | |
|---|---|---|---|
| 1,748,795 | 2/1930 | Roberts | 82/2.5 X |
| 1,243,310 | 10/1917 | Littman | 279/102 |

FOREIGN PATENTS OR APPLICATIONS

| | | | |
|---|---|---|---|
| 1,199,814 | 7/1970 | Great Britain | 82/2.7 |
| 1,098,230 | 1/1968 | Great Britain | 82/2.7 |

*Primary Examiner*—Leonidas Vlachios
*Attorney*—Robert E. Burns and Emmanuel J. Lobato

[57] ABSTRACT

An automatic lathe having a movable push rod for engaging the rear end of a bar to be machined is fitted with a member rotatably connected to one end of the push rod. This member has a threaded hole for gripping the rear end of a bar to be machined, the internal diameter of the threads of the hole being smaller than the diameter of the bar so that when the end of the bar is introduced by relative rotation of the bar and the member into the hole, the threads grip the end of the bar.

2 Claims, 2 Drawing Figures

PATENTED FEB 6 1973
3,714,853
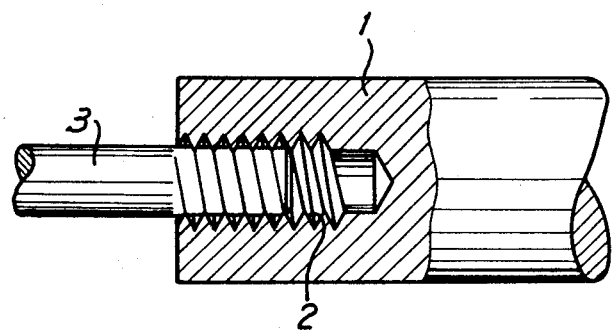
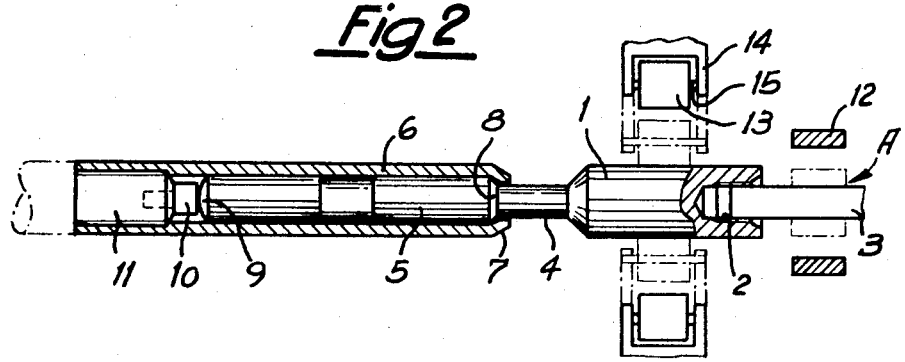

AUTOMATIC LATHES

Feeding devices for automatic lathes are known which include a headstock for rotating and intermittently advancing a bar in order to machine a series of identical pieces from the leading end of the bar, by means of cutting tools provided in front of said headstock. A push rod is provided in the headstock which is axially movable in a guiding device positioned behind the headstock. The push rod engages the rear end of the bar in order to avoid any rearward movement of the bar when the headstock, arriving at its extreme forward position, frees said bar and retracts to re-grip the bar and to move the bar forward for a new step, for the machining of a piece. A driving device acts on said push rod when the push rod reaches its most forward position to return it to its retracted position.

Feeding devices are known for automatically positioning a new bar to be machined in said headstock, when the preceding bar has been fully consumed. As a small piece of the bar generally remains in the headstock which is unusable and relatively long, it is not possible to remove said remaining part in the headstock via the front part of the lathe and consequently, it must be removed from the rear when the push rod retracts under the action of said driving device. It has therefore been suggested to position the push rod in order that it drives said remaining piece out of the headstock. Such a feeding device for an automatic lathe is described in Swiss Pat. No. 350,854. In that device the push rod has a pierced member, removably secured to its front end, the member enclosing a protruberance on the rear end of the bars, which necessitates a particular preparation of said rear end.

The same thing occurs with the push bar described in the Swiss Pat. No. 351,815 in which the push rod comprises two pieces, one being intended to be fixed to the rear end of bars to be machined and the other to be fixed to the end of the push-rod, one of the pieces being hollow and the other having a collar and a head intended to be lodged in the hollow piece behind a shoulder of that piece. The first of said pieces is engaged on a threaded part of the bars. The same drawback exists in the push rod described in the Swiss Pat. No. 409,578, for the use of which it is necessary to fix a head to the end of the bars.

According to the present invention, an automatic lathe having a movable push rod for engaging the rear end of a bar to be machined comprises a member connected to one end of the push rod, the member having a threaded hole for gripping the rear end of a bar to be machined, the internal diameter of the threads of the hole being smaller than the diameter of the bar so that when the end of the bar is introduced by relative rotation of the bar and the member into the hole, the threads grip the end of the bar.

An embodiment of the invention will now be described, by way of example, reference being made to the accompanying schematic drawings, in which:

FIG. 1 is a cross-section through a member for engaging a bar in an automatic lathe; and FIG. 2 is a cross-section showing the means for supporting the member of FIG. 1 and means for the insertion and removal of a bar in the member.

The member 1 is connected as shown to one end of a push rod of an automatic lathe. Referring to FIG. 1, a threaded hole 2 is formed in one end of the member by any known means, the internal diameter of the threads being slightly smaller than the diameter of the rear end of bar 3 to be machined. The difference in diameter is about 15/1000 to 5/100 of mm this difference being sufficient to easily introduce the bar 3 in the hole by simple relative rotation so that the bar 3 is gripped by the member 1 with a sufficient force to be driven by the member 1 during rearward movement of the push rod. The remainder of the bar 3 left after machining is then removed from the member by an unscrewing movement.

The member 1 is extended by a stem portion 4 and a rod 5 rotatably mounted in a sleeve 6. A retracted end 7 of the sleeve 6 cooperates with a bearing surface 8 at the transition of stem portion 4 and rod 5 so as to form a bearing. A curved bearing end 9 of the rod 5 cooperates with a bearing block 10 fixed to a piece 11 firmly fixed in the opposite end of sleeve 6. The piece 11 and sleeve 6 are fixed to a cable or other pushing means (not shown), forming part of a conventional push-rod driving mechanism, and thus together form a push rod. The rod 5 is of slightly smaller diameter than the internal diameter of the sleeve 6 so that it can rotate freely therein, turning between the bearing block 10 and the retracted end 7.

The member 1 is thus freely rotatably mounted in relation to the push-rod.

Means are provided to fix a bar 3 to be machined into the member 1, and to remove the remainder of a machined bar from the member 1. These means comprise grippers 12 for holding the rod 3 and roller means 13 for rotating the member 1.

The bar 3 to be machined, delivered from the turret of an automatic lathe, not shown, is gripped by the grippers 12 and simultaneously member 1 is engaged between rollers 13 mounted on supports 14 and rotatable about axles 15, as shown in dotted lines. The grippers 12 after engagement with the bar 3 then move in the direction of arrow A and the rollers after engagement with the member 1 are rotated by driving means (not shown) so as to relatively rotate the bar and member and screw the bar into the member where it is gripped by the threads 2. The grippers 12 and rollers 13 are then disengaged from the rod 3 and member 1 respectively, and the push-rod is actuated by known means to feed the bar 3 to the lathe head-stock for machining operations.

At the end of machining, the remainder of the bar gripped in the member 1 is returned with the push rod to the initial position and then removed from the member 1 in a similar manner to before, but with the reverse sequence of operations. The remainder of bar 3 and the member 1 are respectively engaged by the gripper 12 and rollers 13. The gripper 12 is then urged in the direction opposite arrow A, whilst the rollers 13 are rotated in the opposite direction to before so that the bar remainder unscrews from member 1. The bar remainder drops out when the grippers 12 are released, so that a fresh bar to be machined can be fed from the turret to be fixed in the member 1.

Since the end of the bar does not have to be specially prepared, time is saved, which helps the operative who may be minding several automatic lathes at any one time.

What is claimed is:

1. In an automatic lathe having a movable push rod for engaging the rear end of a bar to be machined, the combination therewith of a freely rotatable member connected to one end of the push rod, said member having an internally threaded cylindrical opening at its outer end for receiving and gripping the rear end of a bar to be machined, the internal diameter of the threads of said threaded opening being less than the diameter of the bar, so that when the end of the bar is engaged and enters the opening of said member on relative rotation of said member and said bar, the threads will grip and securely hold the end of said bar, means for engaging the bar near its end for holding the same from rotating and for moving said bar axially toward said threaded opening in said rotatable member and means for engaging said rotatable member and for rotating the same as the end of the held bar is axially moved into said threaded opening.

2. The subject-matter of claim 1, including means for releasing the rod stub end from said threaded opening on return of the carriage including means for engaging and turning the freely rotatable member in a reverse direction and means for holding the stub end and axially moving the same away from said rotatable member.

* * * * *